United States Patent
Csapo

(10) Patent No.: US 7,499,460 B2
(45) Date of Patent: Mar. 3, 2009

(54) INTEGRATED WI-FI AND WIRELESS PUBLIC NETWORK AND METHOD OF OPERATION

(75) Inventor: John S. Csapo, Dallas, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 1205 days.

(21) Appl. No.: 10/284,674

(22) Filed: Oct. 31, 2002

(65) Prior Publication Data
US 2003/0202497 A1    Oct. 30, 2003

Related U.S. Application Data

(60) Provisional application No. 60/375,873, filed on Apr. 26, 2002.

(51) Int. Cl.
*H04L 12/28* (2006.01)
(52) U.S. Cl. ............... 370/401; 370/338; 370/335
(58) Field of Classification Search ............... None
See application file for complete search history.

(56) References Cited

U.S. PATENT DOCUMENTS

| | | | |
|---|---|---|---|
| 6,522,628 B1* | 2/2003 | Patel et al. ............... 370/230.1 |
| 6,801,777 B2* | 10/2004 | Rusch ............... 455/452.2 |
| 2003/0112354 A1* | 6/2003 | Ortiz et al. ............... 348/333.01 |
| 2003/0161341 A1* | 8/2003 | Wu et al. ............... 370/448 |
| 2003/0174667 A1* | 9/2003 | Krishnamurthi et al. .... 370/328 |
| 2003/0202524 A1* | 10/2003 | Conner et al. ............... 370/408 |
| 2004/0141522 A1* | 7/2004 | Texerman et al. ........... 370/466 |
| 2004/0253984 A1* | 12/2004 | Csapo et al. ............... 455/561 |

\* cited by examiner

*Primary Examiner*—Duc C Ho

(57) ABSTRACT

An integrated wireless network comprising a wireless public network and a wireless local area network. The wireless public network comprises a plurality of base stations for communicating with mobile stations in the wireless public network. Each base station communicates with mobile stations up to several miles away. The wireless local area network comprises access points for communicating with selected mobile stations located in the wireless local area network. An access point comprises a first transceiver that communicates with selected mobile stations within a short distance of the access point, a second transceiver that communicates with a first base station of the wireless public network; and 3) interconnection circuitry for transferring data traffic between the first transceiver and the second transceiver, such that the access point enables the selected mobile stations to communicate with the first base station via the access point.

24 Claims, 4 Drawing Sheets

INTEGRATED WI-FI AND WIRELESS PUBLIC NETWORK AND METHOD OF OPERATION

The present invention claims priority to U.S. Provisional Application Ser. No. 60/375,873 filed Apr. 26, 2002.

TECHNICAL FIELD OF THE INVENTION

The present invention is directed, in general, to wireless networks and, more specifically, to an integrated 802.xx (WI-FI) and wireless public network.

BACKGROUND OF THE INVENTION

The radio frequency (RE) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RE spectrum. Examples of such modulation techniques include time division multiple access (TDMA), frequency division multiple access (FDMA), and code division multiple access (CDMA).

There is a wide variance in the performance of wireless networks. A conventional public wide area network (WAN), such as a CDMA cellular network, covers a large geographical area (on the order of 1 to 100 plus square miles), but has a relatively low bit-rate between each mobile station and each base station. These public wireless networks use regulated portions of the radio spectrum and are shared by many users. The infrastructure costs of public wireless networks are relatively high due to the size and complexity of the base station equipment.

Newer wireless networks, such-as CDMA2000-EV-DO/DV networks, offer higher bit-rates (on the order to 2.4 MBps) and enhanced data services, such as web browsing. However, these networks also pack many users into a relatively small portion of the regulated spectrum. Still other types of radio networks try to improve spectral efficiency and to increase bit-rates by using unregulated frequencies and smaller coverage areas. For example, an IEEE 802.xx (or WI-FI) network may transmit at speeds up to 11 MBps in Direct Sequence Spread Spectrum (DSSS) mode or at speeds up to 54 MBps in Orthogonal Frequency Division Multiplexing (OFDM) mode.

However, an access point (or base station) in an IEEE 802.xx (e.g., IEEE 802.11) network may cover an area only a few hundred feet in diameter. Each access point is connected to the core network (e.g., Internet) by a point-to-point wireless connection. In order to cover the same geographical area as a base station of a public wireless network, a large number of IEEE 802.xx network access points and a large wireline back haul network are required. The resulting IEEE 802.xx based network may be more expensive to set up and operate (due to back haul cost) than the public wireless network. Thus, there are always tradeoffs between and among the coverage areas, the maximum bit-rates, and the costs of different types of wireless networks.

Therefore, there is a need in the art for an improved wireless network architecture that overcomes the limitations of the above-described conventional wireless networks. In particular, there is a need for a wireless network that provides 802.xx (or equivalent) communication services to mobile stations over a relatively large geographical area, without incurring the costs of a large wireline backhaul network to couple all of the IEEE 802.xx (or equivalent) access points to a core network.

SUMMARY OF THE INVENTION

To address the above-discussed deficiencies of the prior art, it is a primary object of the present invention to provide an integrated wireless network comprising a wireless public network and a wireless local area network. According to an advantageous embodiment of the present invention the wireless public network comprises a plurality of base stations capable of communicating with mobile stations located in a coverage area of the wireless public network, wherein each of the plurality of base stations is capable of communicating with mobile stations up to several miles away; and the wireless local area network comprises a plurality of access points capable of communicating with selected ones of the mobile stations located in a coverage area of the wireless local area network. An exemplary access point comprises: 1) a first transceiver capable of communicating with selected ones of the mobile stations within a short distance of the access point; 2) a second transceiver capable of communicating with a first base station of the wireless public network; and 3) interconnection circuitry capable of transferring data traffic between the first transceiver and the second transceiver, such that the access point enables the selected mobile stations to communicate with the first base station via the access point.

According to one embodiment of the present invention, the first transceiver communicates with the selected mobile stations using an 802.xx wireless protocol.

According to another embodiment of the present invention, the second transceiver communicates with the first base station using a CDMA2000 wireless protocol.

According to still another embodiment of the present invention, the second transceiver is capable of receiving from the first transceiver data traffic received from at least two mobile stations and transmitting the data traffic received from the at least two mobile stations to the first base station in a single channel using the CDMA2000 or any other high capacity wireless protocol.

According to yet another embodiment of the present invention, the access point further comprises an access point-to-access point (AP-AP) interface capable of transmitting to a second access point first data received from a first selected mobile station by the first transceiver, wherein the first data is directed to a second mobile station in communication with the second access point.

According to a further embodiment of the present invention, the AP-AP interface is further capable of receiving second data from the second access point and transferring the second data to the first transceiver for subsequent transmission to the first selected mobile station.

According to a still further embodiment of the present invention, the AP-AP interface communicates with the second access point via a wireline link.

According to a yet further embodiment of the present invention, the AP-AP interface communicates with the second access point via a wireless link.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
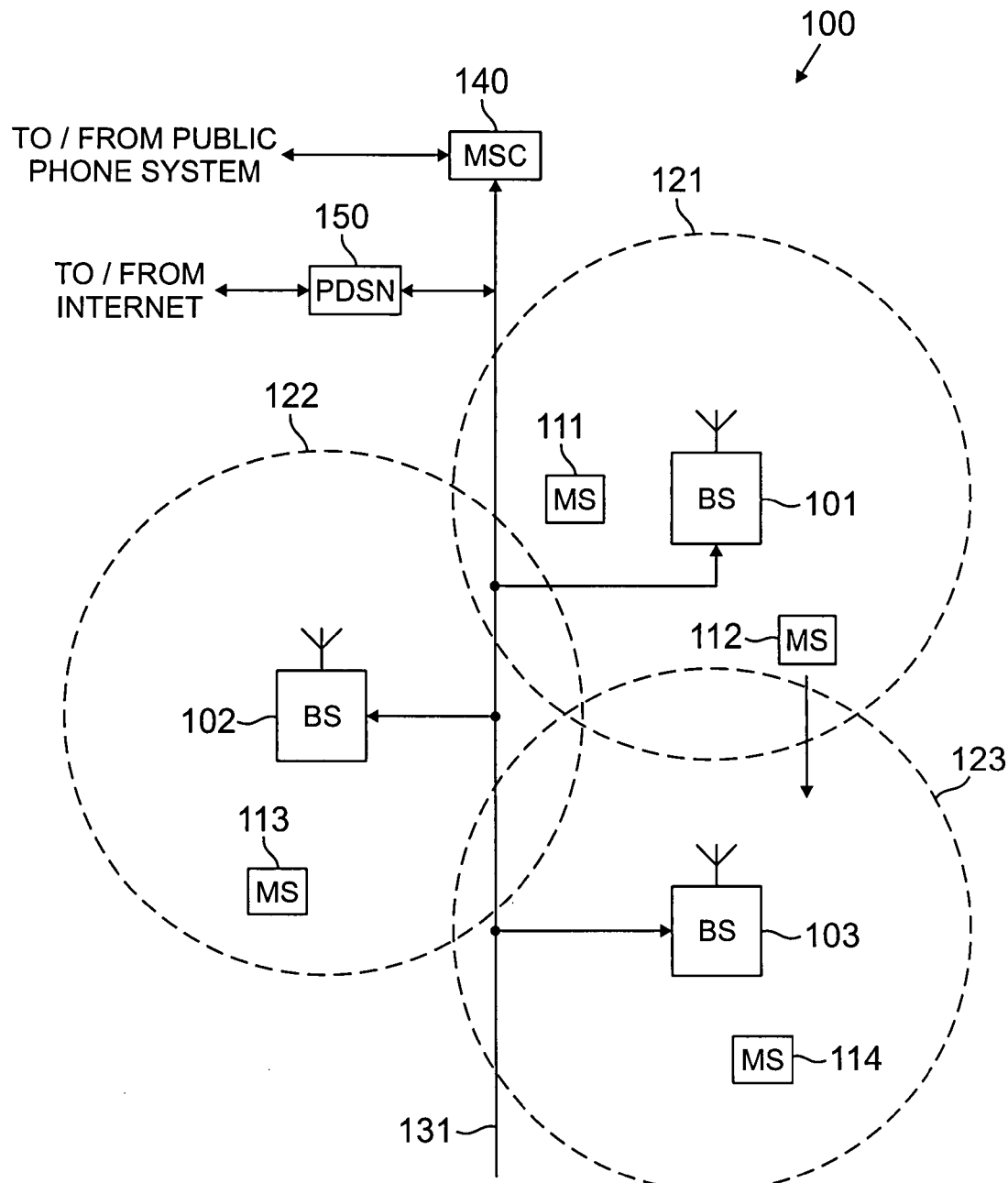
FIG. 1 illustrates a conventional wireless network according to the principles of the prior art.

FIG. 1 illustrates conventional wireless network 100 according to the principles of the prior art. Wireless network 100 comprises a plurality of cell sites 121-123, each containing one of the base stations, BS 101, BS 102, or BS 103. Base stations 101-103 communicate with a plurality of mobile stations (MS) 111-114 over, for example, code division multiple access (CDMA) channels. Mobile stations 111-114 may be any suitable wireless communication devices, including conventional cellular telephones, Personal Communications System (PCS) handset devices, portable computers, telemetry devices, personal digital assistants, and the like, that are capable of communicating with the base stations via wireless radio links. Other types of access terminals, including fixed access terminals, may also be present in wireless network 100. However, for the sake of simplicity, only mobile stations are shown.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors.

Each one of the prior art base stations BS 101, BS 102, and BS 103 may comprise a base station controller (BSC) and one or more separate base transceiver subsystems (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the radio frequency (RF) transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of wireless network 100, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public switched telephone network (PSTN) and/or the Internet (not shown).

Communications line 131 links each vocoder in the base station controller (BSC) with switch elements in the mobile switching center (MSC) 140. Each link provides a digital path for transmission of voice signals in the pulse code modulation (PCM) format. Communications line 131 may be any suitable connection means, including a T1 line, a T3 line, a fiber optic link, a network backbone connection, and the like. In some embodiments, communications line 131 may be several different data links, where each data link couples one of BS 101, BS 102, or BS 103 to MSC 140.

BS 101, BS 102 and BS 103 transfer data signals, such as packet data, between each other and the Internet or other packet data network (not shown) via communications line 131 and packet data serving node (PDSN) 150. Packet data serving node (PDSN) 150 is well known to those skilled in the art.

Communications line 131 also provides a connection path to transfer control signals between MSC 140 and BS 101, BS 102 and BS 103 used to establish connections for voice and data circuits between MSC 140 and BS 101, BS 102 and BS 103. Those skilled in the art will recognize that the connections on communications line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on communications line 131 may provide a transmission path for transmission of analog or digital control signals in a suitable signaling protocol.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located in cell site 121 close to the edge of cell site 123. The direction arrow proximate MS 112 indicates the movement of MS 112 towards cell site 123. At some point, as MS 112 moves into cell site 123 and out of cell site 121, a handoff will occur.

As is well known to those skilled in the art, the handoff procedure transfers control of a call from a first cell site to a second cell site. A handoff may be either a "soft handoff" or a "hard handoff." In a "soft handoff" a connection is made between the mobile station and the base station in the second cell before the existing connection is broken between the mobile station and the base station in the first cell. In a "hard handoff" the existing connection between the mobile station and the base station in the first cell is broken before a new connection is made between the mobile station and the base station in the second cell. An idle handoff is a handoff between cells of a mobile device that is communicating in the control or paging channel, rather than transmitting voice and/or data signals in the regular traffic channels.

Prior art wireless network 100 may be improved by integrating the conventional large cell size base stations with a number of small cell size access points, such as IEEE 802.xx access points. According to the principles of the present invention, a mobile station in the coverage area of the improved integrated wireless network accesses an IEEE 802.xx access point first (i.e., by default) and accesses a base station only if the mobile station fails to access the IEEE 802.xx access point. Each access point has a first wireless interface (e.g., an IEEE 802.11 interface) that communicates with mobile stations and a second wireless interface (e.g., a CDMA2000-EV-DO/DV interface) that communicates with the base stations of conventional wireless network 100. The second wireless interface acts as a backhaul connection to relay mobile station traffic to the base stations.

Figure 2:
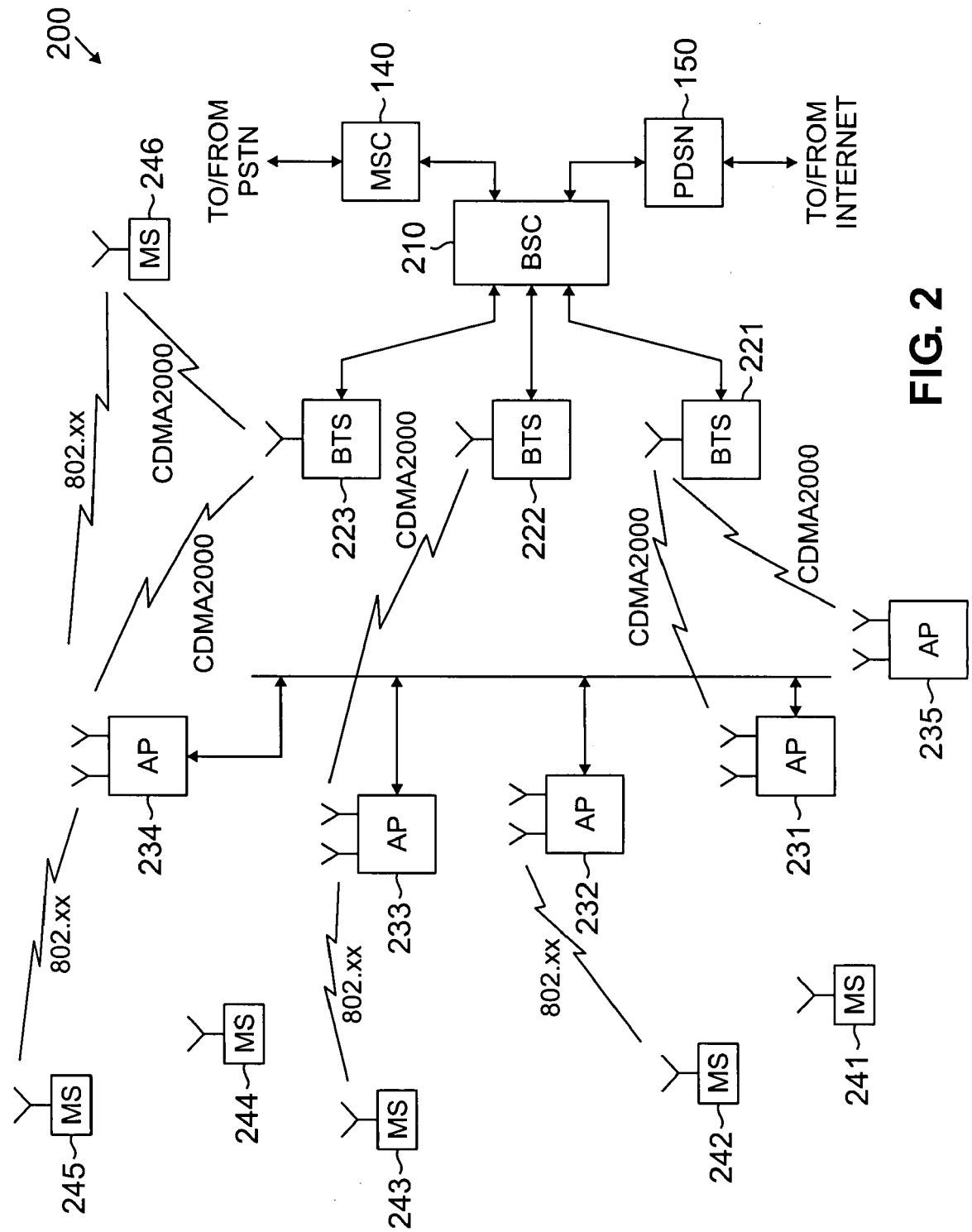
FIG. 2 illustrates selected portions of an exemplary wireless network according to an advantageous embodiment of the present invention.

FIG. 2 illustrates selected portions of exemplary wireless network 200 according to an advantageous embodiment of the present invention. Wireless network 200 is similar in many respects to wireless network 100 and comprises mobile switching center (MSC) 140, packet data serving node (PDSN) 150, and a plurality of base stations, such as BS 101-103 in FIG. 1. For ease of explanation, BS 101 is represented in FIG. 2 by base station controller (BSC) 210 and base transceiver subsystems 221-223. Base station controllers and base transceiver subsystems were discussed above in FIG. 1. Wireless network 200 further comprises access points (APs) 231-235 and communication line 290.

According to the principles of the present invention, access points 231-235 and base transceiver subsystems 221-223 are all capable of communicating with mobile stations 241-246. Access points 231-235 communicate with mobile stations 241-246 in a small coverage area by means of an IEEE 802.xx (or equivalent) air interface. For example, access point (AP) 231, access point (AP) 232, access point (AP) 233, access point (AP) 234, and access point (AP) 235 may be part of an IEEE 802.11 wireless local area network (LAN) in an office building. The maximum range of AP 231, AP 232, AP 233, and AP 234 coverage area may be limited to several hundred yards. Each of mobile stations 241-246 is capable of detecting and accessing one of AP 231, AP 232, AP 233, and AP 234, whenever the mobile station is sufficiently close to the access point. For example, mobile station (MS) 242 is capable of communicating with AP 232 via an IEEE 802.xx link. Similarly, mobile station (MS) 243 is capable of communicating with AP 233 via an IEEE 802.xx link and mobile station (MS) 246 is capable of communicating with AP 234 via an IEEE 802.xx link.

Additionally, base transceiver subsystems 221-223 communicate with mobile stations 241-246 in a larger coverage area by means of a CDMA2000-EV-DO/DV (or equivalent) air interface. For example, base transceiver subsystem (BTS) 221, base transceiver subsystem (BTS) 222, and base transceiver subsystem (BTS) 223 may be part of a CDMA2000-EV-DO/DV (hereafter, sometimes simply "CDMA2000") wireless public network that covers a metropolitan area of many square miles. The maximum range of each of BTS 221, BTS 222, and BTS 223 may be several miles. Each of mobile stations 241-246 is capable of detecting and accessing one of BTS 221, BTS 222, and BTS 223, whenever the mobile station is sufficiently close to the base transceiver subsystem. For example, mobile station (MS) 246 is capable of communicating with BTS 223 via a CDMA2000 link.

According to the principles of the present invention, each one of access points 231-234 also is capable of communicating with one or more of BTS 221-BTS 223 by means of a CDMA2000-EV-DO/DV (or equivalent) air interface. This permits access points 231-234 to use the CDMA2000 air interface as a backhaul network to communicate with the public switched telephone network (via MSC 140) or with the Internet (via packet data server node (PDSN) 150). For example, AP 234 may communicate with MS 244, MS 245 and MS 246 via IEE 802.11 links and may communicate with BTS 223 via a CDMA2000 link. Thus, AP 234 may act as an access concentrator by multiplexing and de-multiplexing data traffic to and from MS 244, MS 245, and MS 246 over the CDMA2000 link. This allows the CDMA2000 air interface to be used more efficiently in wireless network 200. To facilitate this, according to the principles of the present invention, if a mobile station detects both an AP and a BTS, the mobile station will first attempt to access the AP. This allows the access points to concentrate the CDMA2000 air interface traffic to the greatest extent possible.

Additionally, access points 231-234 may transfer data traffic between each other via communication line 290. This reduces the data traffic load on the CDMA2000 air interface by eliminating intra-network data traffic. For example, MS 242 and MS 243 may communicate with each other through AP 232, AP 233, and communication 290 without involving any of BTS 221, BTS 222 and BTS 223. Furthermore, according to an exemplary embodiment of the present invention, communication line 290 may be replaced by a third air interface that handles only data traffic between access points. For example, AP 231-AP 234 may communicate with each other via an OFDM wireless interface. In still another exemplary embodiment of the present invention, AP235 has no line interface to other access points, but it communicates with BTS 221, BTS 222 and BTS 223 via CDMA 2000 interface.

Figure 3:
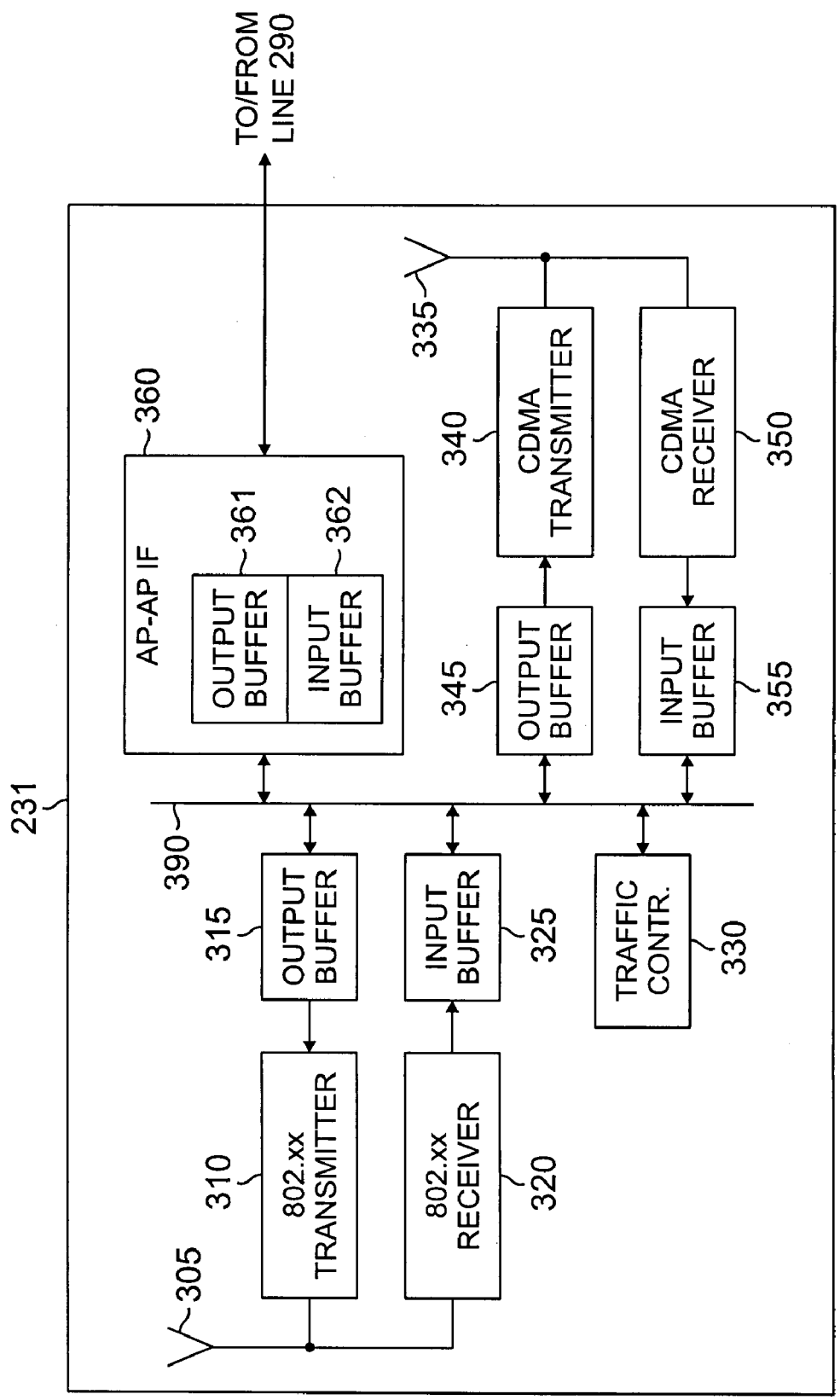
FIG. 3 illustrates in greater detail an access point in FIG. 2 according to an advantageous embodiment of the present invention.

FIG. 3 illustrates exemplary access point (AP) 231 in greater detail according to an advantageous embodiment of the present invention. Access point 231 comprises antenna 305, 802.xx transmitter block 310, output buffer 315, 802.xx receiver block 320, input buffer 325, and traffic controller 330. Access point 231 also comprises antenna 335, CDMA transmitter block 340, output buffer 345, CDMA receiver block 350, input buffer 355, and access point-to-access point (AP-AP) interface 360. AP-AP interface comprises output buffer 361 and input buffer 361. Output buffer 315, input buffer 325, traffic controller 330, output buffer 345, input buffer 355, and AP-AP interface 360 are coupled to, and communicate across, data bus 390.

Forward channel data traffic being transmitted to a mobile station is buffered in output buffer 315 and transmitted to a target mobile station via 802.xx transmitter 310 and antenna 305. Reverse channel data traffic is received from a mobile station by antenna 305 and 802.xx receiver 320 and is buffered in input buffer 325. Similarly, reverse channel data traffic being transmitted to a base transceiver subsystem (BTS) is buffered in output buffer 345 and transmitted to a target BTS via CDMA transmitter 340 and antenna 335. Forward channel data traffic is received from a BTS by antenna 335 and CDMA receiver 350 and is buffered in input buffer 355.

Data is transferred to communication line 290 by access point-to-access point (AP-AP) interface (IF) 360. Output buffer 361 buffers data being transferred to other access points and input buffer 362 buffers data being received from other access points. As noted above, in one embodiment of the present invention, communication line 290 may be replaced by a third air interface that handles only data traffic between access points or completely eliminated as in the case of AP 235. Thus, AP-AP IF 360 may be, for example, an OFDM wireless interface.

Traffic controller 330 directs the overall operation of exemplary AP 231. Traffic controller 330 is operable to combine data traffic from two or more IEEE 802.xx air interface links into a single data stream on a CDMA2000 air interface link. This enables AP 234 to act as an access concentrator.

Figure 4:
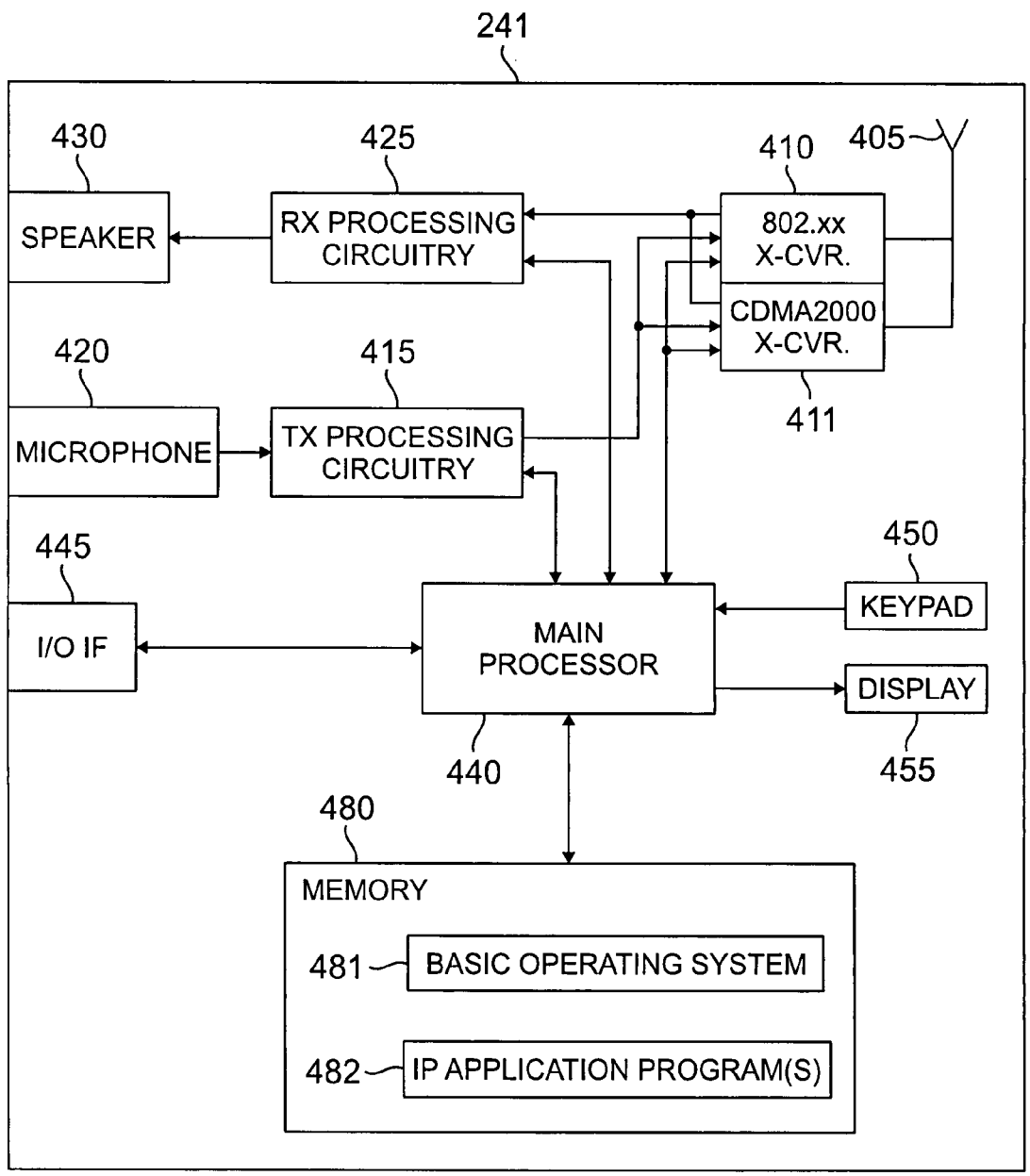
FIG. 4 illustrates in greater detail a dual mode mobile station capable of communicating with an exemplary wireless network according to an advantageous embodiment of the present invention.

FIG. 4 illustrates in greater detail exemplary dual mode mobile station 241 according to an advantageous embodiment of the present invention. Wireless mobile station 241 comprises antenna 405, 802.xx transceiver (X-CVR) 410, CDMA2000 transceiver 411, transmitter (TX) processing circuitry 415, microphone 420, receiver (RX) processing circuitry 425, speaker 430, main processor 440, input/output (I/O) interface (IF) 445, keypad 450, and display 455. Wireless mobile station 241 further comprises memory 480, which stores basic operating system (OS) program 481, and one or more Internet protocol (IP) application program(s) 482.

Mobile station 241 is capable of transmitting and receiving in two modes: 802.xx mode and CDMA2000 mode. The operating mode is controlled by basic operating system 481 and is determined by whether mobile station 241 detects an IEEE 802.xx wireless network or a CDMA200 wireless network in the local area. If mobile station 241 detects both an IEEE 802.xx wireless network and a CDMA200 wireless network, mobile station 241 operates in a preferred 802.xx mode. If the IEEE 802.xx wireless network is subsequently lost, mobile station 241 switches to CDMA2000 mode. In this way, the 802.xx access points can combine data traffic from multiple mobile stations onto a single CDMA2000 radio link, thereby conserving resources of the CDMA2000 base stations.

IEEE 802.xx transceiver 410 receives from antenna 405 an incoming RF signal transmitted by one of access points 231-234 of wireless network 200. IEEE 802.xx transceiver 410 down-converts the incoming RF signal to produce an intermediate frequency (IF) or a baseband signal. Similarly, CDMA2000 transceiver 411 receives from antenna 405 an incoming RF signal transmitted by one of base transceiver subsystems 221-223 of wireless network 200. CDMA2000 transceiver 411 down-converts the incoming RF signal to produce an intermediate frequency (IF) or a baseband signal.

The IF or baseband signal from IEEE 802.xx transceiver 410 or CDMA2000 transceiver 411 is sent to RX processing circuitry 425, which produces a processed baseband signal by filtering, decoding, and/or digitizing the baseband or IF signal to produce a processed baseband signal. RX processing circuitry 425 transmits the processed baseband signal to speaker 430 (i.e., voice data) or to main processor 440 for further processing (i.e., web browsing).

TX processing circuitry 415 receives analog or digital voice data from microphone 420 or other outgoing baseband data (i.e., web data, e-mail, interactive video game data) from main processor 440. TX processing circuitry 415 encodes, multiplexes, and/or digitizes the outgoing baseband data to produce a processed baseband or IF signal. IEEE 802.xx transceiver 410 or CDMA2000 transceiver 411 receives the outgoing processed baseband or IF signal from TX processing circuitry 415. IEEE 802.xx transceiver 410 or CDMA2000 transceiver 411 up-converts the baseband or IF signal to an RF signal that is transmitted via antenna 405.

In an advantageous embodiment of the present invention, main processor 440 is a microprocessor or microcontroller. Memory 480 is coupled to main processor 440. Memory 480 may be comprised of solid-state memory such as random access memory (RAM), various types of read-only memory (ROM), or Flash RAM. Memory 480 may also include other types of memory such as micro-hard drives or removable storage media that stores data. Main processor 440 executes basic operating system (OS) program 481 stored in memory 480 in order to control the overall operation of wireless mobile station 241. In one such operation, main processor 440 controls the reception of forward channel signals and the transmission of reverse channel signals by IEEE 802.xx transceiver 410 and CDMA2000 transceiver 411, RX processing circuitry 425, and TX processing circuitry 415, in accordance with well-known principles.

Main processor 440 is capable of executing other processes and programs resident in memory 480. Main processor 440 can move data into or out of memory 480, as required by an executing process. Main processor 440 is also coupled to I/O interface 445. I/O interface 445 provides the mobile station with the ability to connect to other devices such as laptop computers and handheld computers. I/O interface 445 is the communication path between these accessories and main controller 440.

Main processor 440 is also coupled to keypad 450 and display unit 455. The end user of mobile station 241 used keypad 450 to enter data into mobile station 241. Display 455 may be a liquid crystal display capable of rendering text and/or at least limited graphics from Web sites. Alternate embodiments may use other types of displays.

Although the present invention has been described in detail, those skilled in the art should understand that they could make various changes, substitutions and alterations herein without departing from the spirit and scope of the invention in its broadest form.

What is claimed is:

1. An access point for communicating with mobile stations located in a coverage area of an integrated wireless network, said access point comprising:
   a first transceiver configured for wirelessly communicating with selected ones of said mobile stations within a short distance of said access point;

a second transceiver configured for wirelessly communicating with a first base station up to several miles away in wireless public network portion of said integrated wireless network; and interconnection circuitry configured for transferring data traffic between said first transceiver and said second transceiver, such that said access point enables said selected mobile stations to communicate with said first base station via said access point.

2. The access point as set forth in claim 1 wherein said first transceiver communicates with said selected mobile stations using an IEEE 802.xx wireless protocol.

3. The access point as set forth in claim 2 wherein said second transceiver communicates with said first base station using a CDMA2000 wireless protocol.

4. The access point as set forth in claim 3 wherein said second transceiver is configured for receiving from said first transceiver data traffic received from at least two mobile stations and transmitting said data traffic received from said at least two mobile stations to said first base station in a single channel using said CDMA2000 wireless protocol.

5. The access point as set forth in claim 1 wherein said first transceiver is configured for communicating with said selected ones of said mobile stations within 500 feet of said access point.

6. The access point as set forth in claim 1 further comprising an access point-to-access point (AP-AP) interface configured for transmitting to a second access point first data received from a first mobile station of said selected ones of said mobile stations by said first transceiver, wherein said first data is directed to a second mobile station in communication with said second access point.

7. The access point as set forth in claim 6 wherein said AP-AP interface is further configured for receiving second data from said second access point and transferring said second data to said first transceiver for subsequent transmission to said first selected mobile station.

8. The access point as set forth in claim 7 wherein said AP-AP interface communicates with said second access point via a wireline link.

9. The access point as set forth in claim 7 wherein said AP-AP interface communicates with said second access point via a wireless link.

10. An integrated wireless network comprising:

a wireless public network comprising a plurality of base stations configured for wirelessly communicating with mobile stations located in a coverage area of said wireless public network, wherein each of said plurality of base stations is configured for wirelessly communicating with mobile stations up to several miles away; and a wireless local area network comprising a plurality of access points configured for wirelessly communicating with selected ones of said mobile stations located in a coverage area of the wireless local area network, a first one of said plurality of access points comprising:

a first transceiver configured for wirelessly communicating with said selected mobile stations within a short distance of said first access point;

a second transceiver configured for wirelessly communicating with a first one of said plurality of base stations; and interconnection circuitry configured for transferring data traffic between said first transceiver and said second transceiver, such that said first access point enables said selected mobile stations to communicate with said first base station via said first access point.

11. The integrated wireless network as set forth in claim 10 wherein said first transceiver communicates with said selected mobile stations using an IEEE 802.xx wireless protocol.

12. The integrated wireless network as set forth in claim 11 wherein said second transceiver communicates with said first base station using a CDMA2000 wireless protocol.

13. The integrated wireless network as set forth in claim 12 wherein said second transceiver is configured for receiving from said first transceiver data traffic received from at least two mobile stations and transmitting said data traffic received from said at least two mobile stations to said first base station in a single channel using said CDMA2000 wireless protocol.

14. The integrated wireless network as set forth in claim 10 wherein said first transceiver is configured for communicating with said selected ones of said mobile stations within 500 feet of said first access point.

15. The integrated wireless network as set forth in claim 10 further comprising an access point-to-access point (AP-AP) interface configured for transmitting to a second access point first data received from a first mobile station of said selected ones of said mobile stations by said first transceiver, wherein said first data is directed to a second mobile station in communication with said second access point.

16. The integrated wireless network as set forth in claim 15 wherein said AP-AP interface is further configured for receiving second data from said second access point and transferring said second data to said first transceiver for subsequent transmission to said first selected mobile station.

17. The integrated wireless network as set forth in claim 16 wherein said AP-AP interface communicates with said second access point via a wireline link.

18. The integrated wireless network as set forth in claim 16 wherein said AP-AP interface communicates with said second access point via a wireless link.

19. A method of operating a first one of the plurality of access point in an integrated wireless network having: 1) a wireless public network configured for wirelessly communicating with mobile stations up to several miles away located in a coverage area of the wireless public network; and 2) a wireless local area network comprising a plurality of access points configured for wirelessly communicating with selected ones of the mobile stations located in a coverage area of the wireless local area network, the method comprising the steps of:

wirelessly communicating with the selected mobile stations up to several miles away within a short distance of the first access point via a first transceiver;

wirelessly communicating with a first one of the plurality of base stations via a second transceiver; and transferring data traffic between the first transceiver and the second transceiver to thereby enable the selected mobile stations to communicate with the first base station via the first access point.

20. The method as set forth in claim 19 wherein the first transceiver communicates with the selected mobile stations using an 802.xx wireless protocol.

21. The method as set forth in claim 20 wherein the second transceiver communicates with the first base station using a CDMA2000 wireless protocol.

22. A mobile station for communicating with an integrated wireless network comprising: 1) a wireless public network comprising a plurality of base stations configured for wirelessly communicating with said mobile station up to several miles away; and 2) a wireless local area network comprising a plurality of access points configured for wirelessly communicating with said mobile station, wherein a first one of said plurality of access points is configured for communicating via a first wireless link with a first one of said plurality of base stations, said mobile station comprising:

a first transceiver configured for wirelessly communicating with said plurality of base stations of said wireless public network; and a second transceiver configured for wirelessly communicating with said plurality of access points of said wireless local area network, wherein said mobile station, upon detection of said first base station and said first access point, accesses said first access point in order to communicate indirectly with said wireless public network via said first wireless link.

23. The mobile station network as set forth in claim 22 wherein said first transceiver communicates with said plurality of base stations using a CDMA2000 wireless protocol.

24. The mobile station network as set forth in claim 23 wherein said second transceiver communicates with said plurality of access points using an IEEE 802.xx wireless protocol.

* * * * *

UNITED STATES PATENT AND TRADEMARK OFFICE
CERTIFICATE OF CORRECTION

PATENT NO. : 7,499,460 B2  Page 1 of 1
APPLICATION NO. : 10/284674
DATED : March 3, 2009
INVENTOR(S) : John S. Csapo It is certified that error appears in the above-identified patent and that said Letters Patent is hereby corrected as shown below:

Column 1, line 16, delete "(RE)" and replace with --(RF)--;

Column 1, line 22, delete "RE" and replace with --RF--.

Signed and Sealed this

Sixth Day of July, 2010

David J. Kappos
*Director of the United States Patent and Trademark Office*